United States Patent [19]

Richter et al.

[11] Patent Number: 4,492,473
[45] Date of Patent: Jan. 8, 1985

[54] OPTICAL MICROMETER

[75] Inventors: Bruno Richter, Stegaurach; Bernhard Brand, Niederwerrn, both of Fed. Rep. of Germany

[73] Assignee: Bruno Richter GmbH, Stegaurach, Fed. Rep. of Germany

[21] Appl. No.: 90,331

[22] Filed: Nov. 1, 1979

[30] Foreign Application Priority Data

Nov. 14, 1978 [DE] Fed. Rep. of Germany ....... 2849252

[51] Int. Cl.³ .................. G01B 11/02; G01B 11/08; G01B 11/10
[52] U.S. Cl. .................................... 356/386; 356/387
[58] Field of Search .................. 356/386–387, 356/380; 250/560, 224; 307/233 R, 233 A

[56] References Cited

U.S. PATENT DOCUMENTS

| | | | |
|---|---|---|---|
| 3,448,402 | 6/1969 | Booker, Jr. et al. | 307/233 |
| 3,533,701 | 10/1970 | Hruby et al. | 356/387 |
| 3,765,774 | 10/1973 | Petrohilos | 250/560 |
| 3,905,705 | 9/1975 | Petrohilos | 250/560 |
| 3,997,269 | 12/1976 | Moulton | 250/560 |

*Primary Examiner*—William H. Punter
*Attorney, Agent, or Firm*—Hill, Van Santen, Steadman & Simpson

[57] ABSTRACT

An optical micrometer and position detector has a rotating mirror driven by a motor which deflects a coherent light beam toward a collimating lens for directing parallel light beams at an object to be measured. A photoelectric detector determines portions of the parallel beams which are blocked by the object and provides a pulse signal from which a dimension or position gap signal is generated and displayed. The rotating mirror is mounted on a shaft for corotation with a cylindrical encoder for generation of electric signals proportional to the angular velocity of the mirror and which controls a voltage controlled oscillator having an output which is combined with the dimension or position gap signal for display. The displayed signal is thus automatically corrected for minimization of external and/or internal mechanical influences on the angular velocity of the mirror.

6 Claims, 6 Drawing Figures

OPTICAL MICROMETER

BACKGROUND OF THE INVENTION

1. Field of the Invention

The present invention relates to opto-electric measuring devices, and in particular such devices for measuring the attitude or position and dimension of objects by generation of a digital pulse train having pulses with a temporal position corresponding to the position of the object to be measured.

2. Description of the Prior Art

Opto-electric measuring devices utilizing a collimated beam of parallel light rays which is directed at an object to be measured are known in the art, such as the optical measuring apparatus disclosed in U.S. Pat. No. 3,765,774 and in U.S. Pat. No. 3,905,705. Conventional optical measuring devices of this type have a light source which emits a highly concentrated light beam which is deflected into a scanning plane by the use of a rotating mirror driven by a motor. The rotation of the mirror directs the beam toward a collimating means from which the light emerges in parallel rays to scan an object to be measured. A converging lens collects the parallel beams and directs them at a photoelectric detector which is connected to circuitry for generating electric signals whose temporal gap corresponds to the rotating velocity of the motor and which are interrupted by blockage of light as the beam sweeps over the object to be measured. A pulse generator controls a counting device which is combined with a gap signal for generation of a final gap signal which is then displayed.

In conventional optical measuring devices of the type described above, the pulse generator serves not only to supply an input level for a logic circuit or gate circuit which is pre-connected to the counting device and which receives a second input level from the detection device for the light beam, but also to drive the motor for rotating the mirror. The motor may, however, be subject to fluctuations in its mechanical rotary motion which are transmitted and amplified to the deflection motion of the light beam comprising the scanning sweep. Precise measurement operation requires an exact, predictable relationship between the inputs to the gap signal generating logic circuit, i.e. the inputs thereto received from the detection device, and the pulse generator. Inasmuch as the detection device derives its output signals from the light beam scanning motion which impinges thereon, unmeasured random fluctuations destroy the predicted relationship between the inputs to the logic circuit, thereby introducing error into the measurement.

SUMMARY OF THE INVENTION

It is an object of the present invention to avoid system errors of the type discussed above in the measurement and determination of the position and/or dimension of objects which are scanned with the light beam by automatically correcting for departures from predicted values between the signals introduced to the gap signal generating logic, thereby minimizing or eliminating altogether errors in measurement due to inertial or other external mechanical influences which cause the angular velocity of the rotating mirror to deviate from a constant value.

This object is inventively achieved in an optical measuring device utilizing a rotating mirror to produce a scanning beam which is then collimated, directed at an object to be measured, and the light then collected and a digital pulse train derived therefrom representing the position of the object, by utilizing a shaft encoder which is driven by the same motor which rotates the mirror for the generation of pulse signals which are proportional to the angular velocity of the encoder and the mirror. The pulse generator is a voltage controlled oscillator and the frequency of this oscillator is controlled by a frequency regulation loop connected thereto for which the signals received from the shaft encoder are utilized as a reference signal.

In the preferred embodiment, the voltage controlled oscillator together with a post-connected frequency divider, a frequency and phase comparison circuit, and a controlling amplifier comprise the frequency and phase control loop. The frequency of the oscillator is generated synchronously with the frequency of the pulse signals received from the shaft encoder and by interconnection of the frequency divider generating the divided frequency for the comparison circuit, the oscillator frequency is a multiple of the shaft encoder frequency that is pre-determined and which can be selectively adjusted. In this manner, the oscillator is controlled by the shaft encoder which is directly coupled to the motor so that an exact relationship always exists between the angle of the rotating mirror and the number of pulses which are supplied to an AND gate which is pre-connected to the counting and display device and gated by the gap signal generated in the gap signal generating logic. In the following this gap signal generating logic is designated as gap logic.

By allowing for adjustment of the dividing ratio of the frequency divider the precision of the measuring device can be further increased.

Another problem contributing to measurement error is the fact that the scanning light beam does not sweep over the arc in which the collimator is situated with a constant sweep velocity. The velocity of the point of incidence of the light beam on the collimator is greatest at the outer edge of the collimator and decreases to a point at the center of the collimator which is the shortest distance between the rotating mirror and the collimator. The sweep velocity of the incident light beam then increases again until it reaches the opposite outer edge of the collimator. Thus the movement of the light beams in a plane between a collimating means and a collector does not occur with constant velocity. Because measurement of an object between the collimators is undertaken by determining the amount of light blocked by the object, an object which for example is one millimeter wide which is placed at the edge of the plane of parallel light beams will block light for a less amount of time than the same object which is near the center of the plane, because the sweep velocity of the scanning beam is faster at the edges of the plane. The error introduced due to a non-constant sweep velocity increases with increased aperture angle, i.e., the solid angle through which light beam sweep moves as a result of reflection off of the rotating mirror.

In order to eliminate this error, the pulses of the shaft encoder can be additionally supplied to a second counter which has a reset input which is connected to a device for generating a reset pulse when the motor armature attains one or more designated specific positions. The output of the second counter is then transmitted to address inputs of a memory circuit which in turn transmits a signal to an electronic adjusting circuit which automatically adjusts the dividing ratio of the frequency divider to compensate for the error. By adjusting the dividing ratio of the frequency divider the frequency of the pulse generator can be correspondingly adjusted so that the position signal generator logic circuitry, when combined in a gate with the pulse generator output, will result in an errorless output to the counter and display unit.

Although the required reset pulse can be derived from the shaft encoder itself by means of a signal output for a pulse indicating a specific position of the shaft encoder, it is also possible to employ a coded rotational angle encoder as the shaft encoder, and to conduct output signals therefrom to the address inputs of the memory circuit. This has the advantage of eliminating the need for the interconnection of a second counter.

A third method for deriving the required reset pulse from the light beam deflected from the rotating mirror is utilization of a second light receiver which is positioned to detect and receive light immediately prior to impingement on the collimating means, and therefore immediately prior to the sweep over the collimator. The signal from the second light detector is then supplied to the second counter as the reset signal.

DESCRIPTION OF THE PREFERRED EMBODIMENTS

Figure 1:
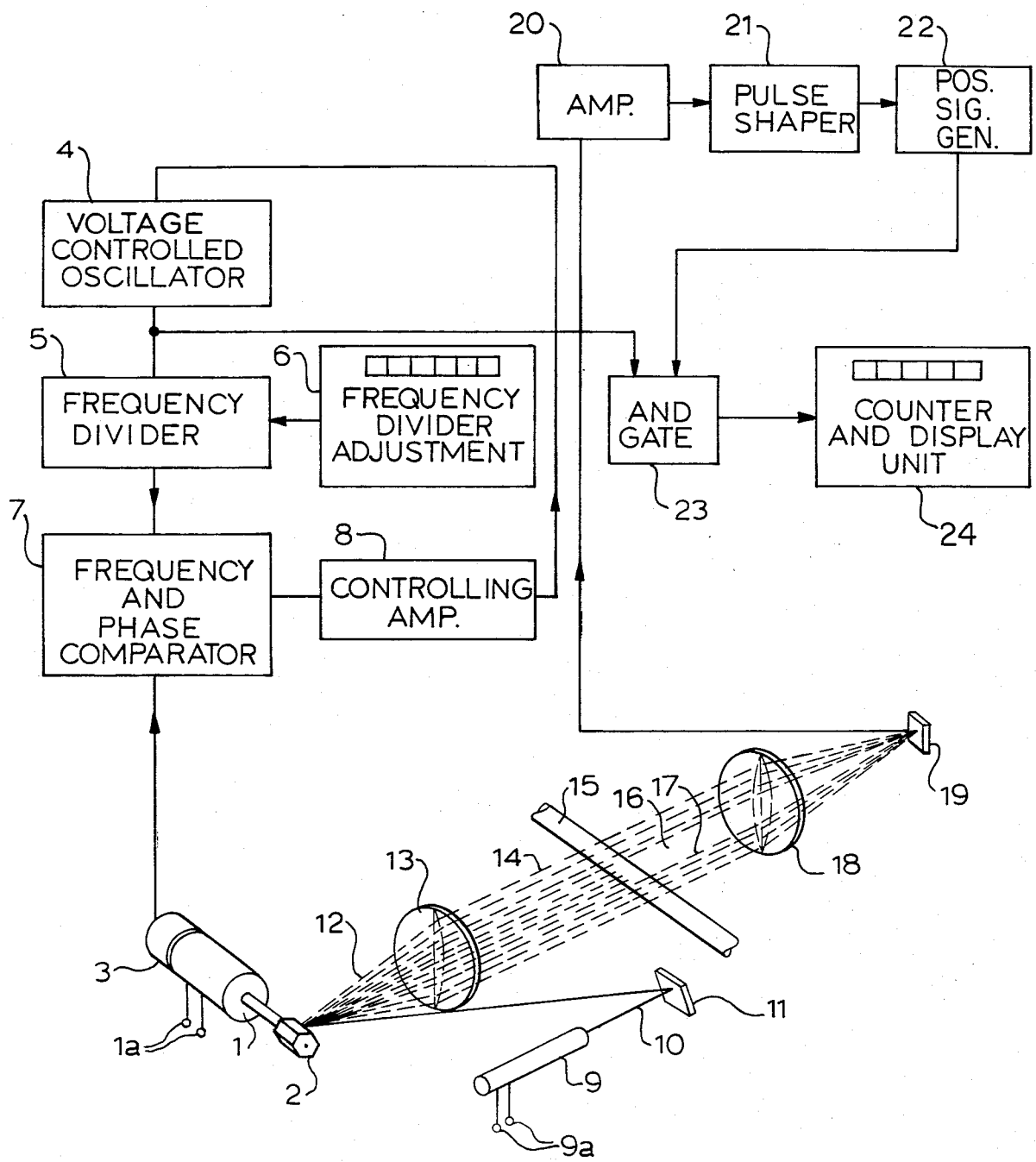
FIG. 1 is a schematic illustration of an opto-electric measuring device with a shaft encoder and associated dimension or position determining circuitry in accordance with the principles of the present invention.
Figure 1A:
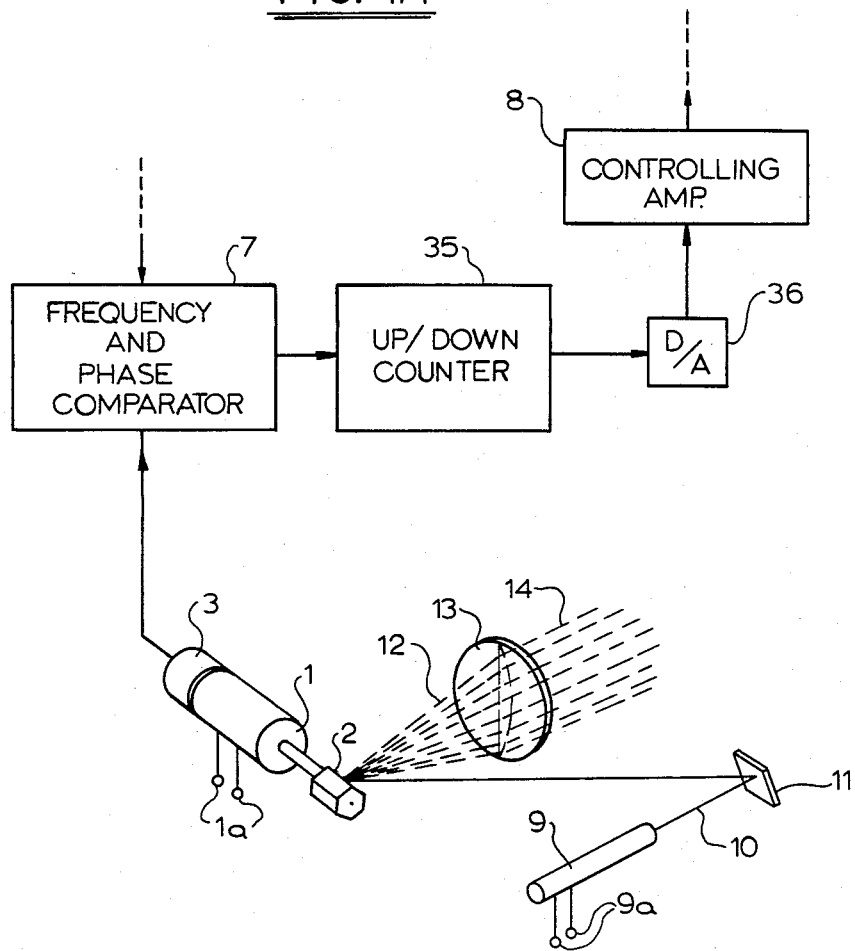
FIG. 1A is an embodiment of the device of FIG. 1 utilizing an up/down counter and a digital/analog converter in the control loop.

An opto-electric measuring device constructed in accordance with the principles of the present invention is illustrated in FIG. 1. The device includes an electric motor 1 to which power is supplied from an outside source connected at terminals 1a. The motor 1 rotates a multi-faced mirror 2 connected to the shaft of the motor, and also rotates a shaft encoder 3 which generates electronic pulses having a frequency proportional to the rotational velocity of the shaft of the motor 1.

A coherent light source 9, such as a laser tube, which receives power from a supply connected at terminals 9a, emits a coherent light beam 10 which is directed at a mirror 11. The mirror 11 reflects the beam 10 toward the rotating mirror 2 which produces a scanning beam 12 by the rotational effect combined with its reflective properties. The scanning beam 12 reflected by the rotating mirror 2 sweeps over a sector lying in a plane in which a first collimating means 13 is disposed. The collimating means 13, which may be a collimating lens, produces parallel light beams 14.

An object 15 to be measured is situated within the plane 14 traversed by the parallel beams, with the object 15 interrupting the beam path in a section 16 during a time span which corresponds to the attitude and dimension of the object 15. The parallel beams then are focused by a focusing lens 18 so that the uninterrupted portion of the beam 17 falls upon a photocell 19 which emits an electric signal corresponding to the temporal pattern of incidence of the beam.

The signal from the photocell 19 is amplified by an amplifier 20 and is shaped by a pulse shaper 21. This signal is then supplied to a position signal generator 22 which is a logic circuit which generates a control signal from the level transitions of the signal from the pulse shaper 21. The control signal from the position signal generator 22 represents the measure of the position or the dimension of the object 15 as determined by the temporal duration of the portions of the light beam impinging on the photocell 19. This control signal is supplied to one input of a logical AND gate 23.

The other input to the AND gate 23 is from a voltage controlled oscillator 4 which is connected in a frequency control loop with the pulse signals from the shaft encoder 3 utilized as a reference signal. A frequency divider 5 which is connected to a frequency divider adjustment device 6 for adjustment of the dividing ratio thereof receives the output from the voltage controlled oscillator and transmits a selected division thereof to a frequency and phase comparator 7, which also receives the pulse train from the shaft encoder 3. A comparison is undertaken and the output of the comparator 7 is amplified by a controlling amplifier 8 and fed back to the oscillator. The oscillator is thus set to a frequency which is synchronous with the frequency of the shaft encoder 3, which in turn is directly coupled to the motor 1 and will reflect any variations in the angular velocity of the motor shaft (and the mirror 2) due to line fluctuations having magnetic or mechanical effects.

The pulses of the voltage controlled oscillator 4 are supplied to the AND gate 23 wherein they are combined with the output of the gap logic 22, with the output of the AND gate 23 being supplied to a counter and display unit 24. The display shown on the device 24 is thus independent of fluctuations of the rotational velocity of the motor 1 and corresponds exactly to the measure of the object 15. Adjustment of the display unit output can be undertaken by suitable monitoring and adjustment of the frequency divider by means of the frequency divider adjustment device 6.

As discussed above, measurement error may also be introduced by failing to compensate for the fact that the sweep velocity of the beam 12 across the collimator 13 is not constant, but rather is greatest at the edges of the collimator 13 and slowest at the central portion of the collimator 13, which is the shortest distance from the mirror 2. Three embodiments for compensating for the non-constant sweep velocity are respectively illustrated in FIGS. 2, 2a and 2b.

Figure 2:
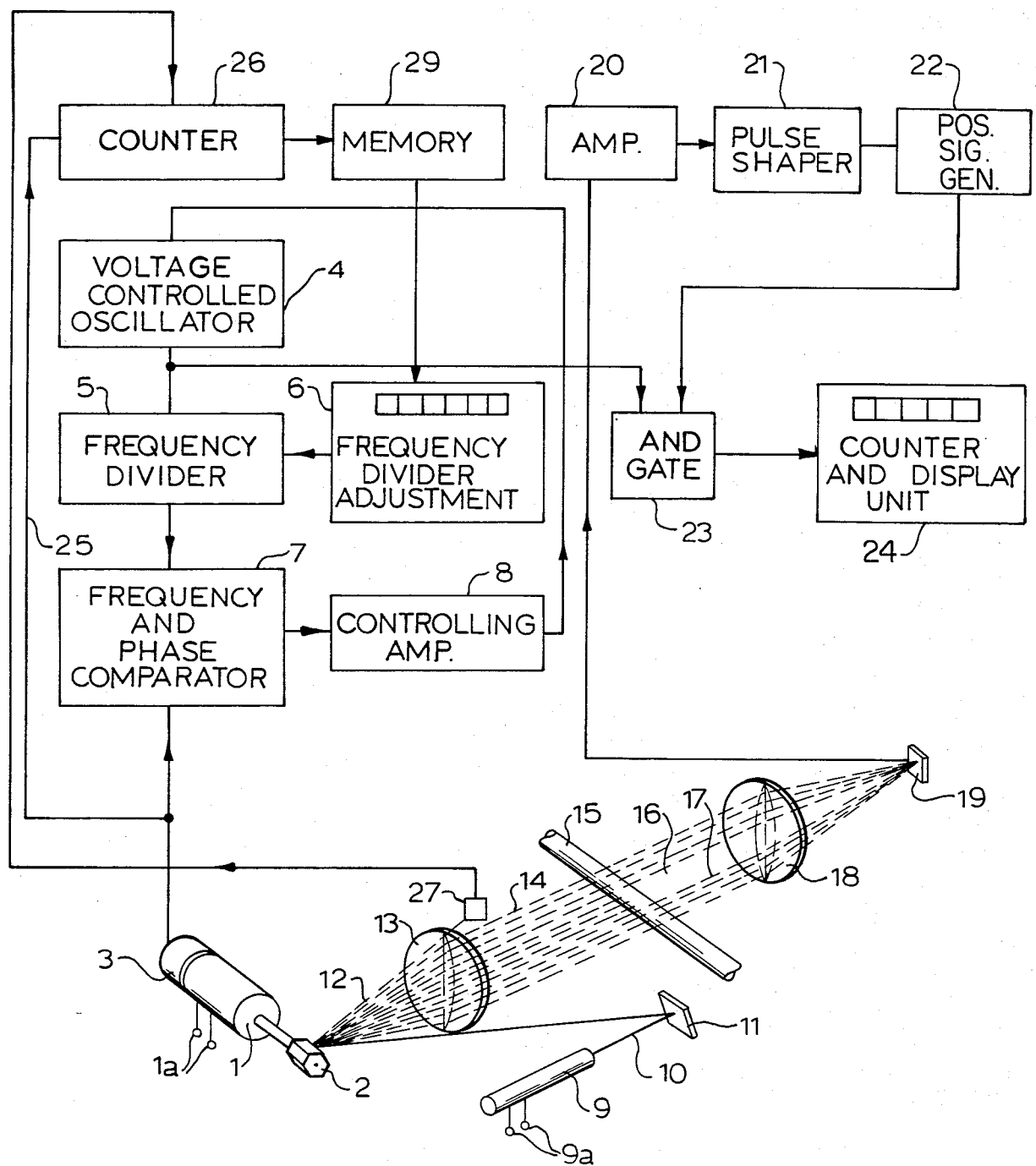
FIG. 2 is an embodiment of the device of FIG. 1 utilizing a second counter and a memory for eliminating error due to non-constant sweep velocity.

A first embodiment for solving this problem is shown in FIG. 2 in which the pulses from the shaft encoder 3 are supplied through a line connection 25 to a second counter 26. As also shown in FIG. 2, a second light beam receiver 27 is positioned to receive light from the beam 12 immediately prior in time to the impingement of the beam 12 on the collimator 13. The receiver 27 emits a signal which is transmitted to the counter 26 and serves as a reset signal which sets the counter 26 to a specific counter reading after which the counter begins to count the pulses from the shaft encoder 3.

The counter reading of the counter 26 is transmitted to an address input of a memory 29 which in turn supplies an input control signal to the frequency divider adjustment device 6. The memory 29 is programmed to insert the received counter signals into a program for generating an adjusting output to the frequency divider adjustment device 6 in accordance with the calculated rate of change of the sweep velocity across the width of the collimator 13. By controlling the dividing ratio of the frequency divider 5, the oscillator frequency can be continuously monitored and controlled so that the ultimate output to the counter and display unit 24 will not reflect the non-constant sweep velocity error.

Figure 2A:
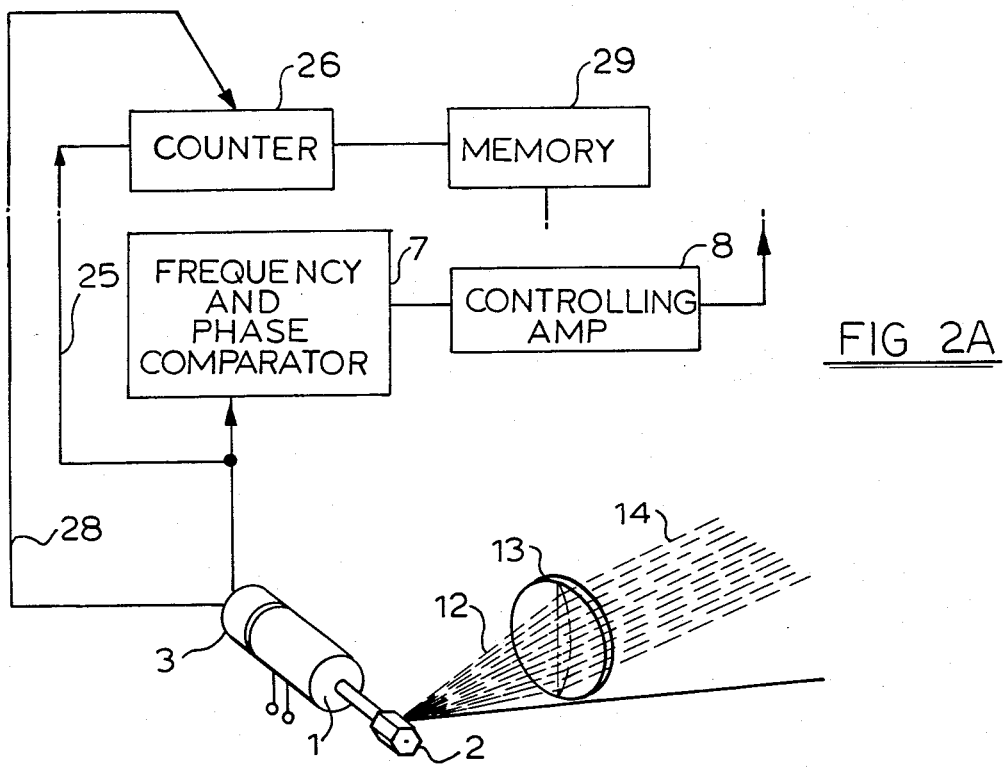
FIG. 2a is another embodiment of the device of FIG. 1 utilizing a second counter and a memory to eliminate error due to non-constant sweep velocity and with the reset pulse derived from the shaft encoder.

In a second embodiment shown in FIG. 2a, the shaft encoder 3 is utilized as the device for generating the reset pulse in place of the light beam receiver 27. The encoder provides output signals at a selected position, or a number of positions, during the course of its rotation, which correspond to the beginning of a scanning beam sweep. These signals are utilized to reset the counter 26 which operates the memory as described above.

Figure 2B:
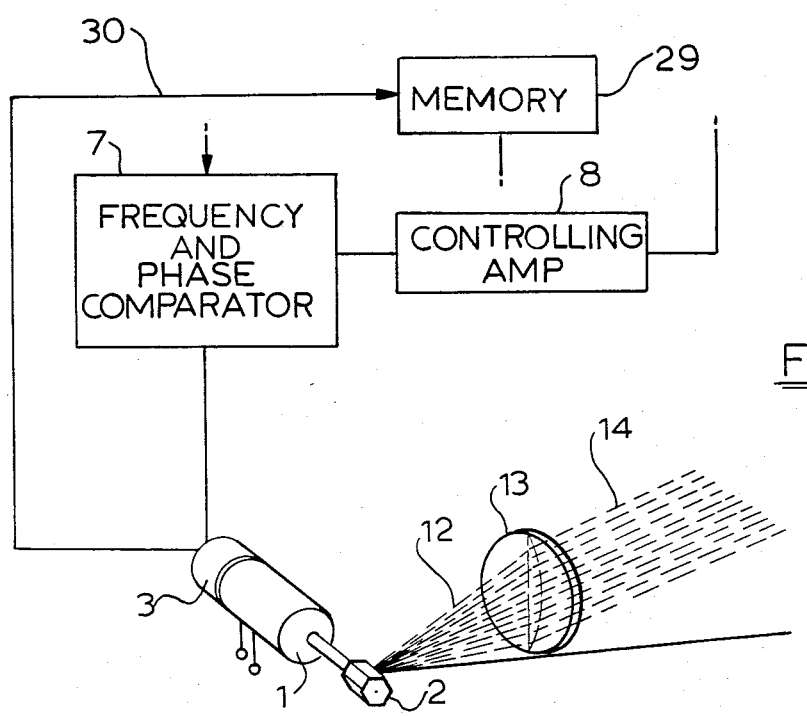
FIG. 2b is a third embodiment of the device of FIG. 1 utilizing an addressing connection from the encoder to a memory to eliminate error due to non-constant sweep velocity.

A third embodiment for eliminating the problem of a non-constant sweep velocity is shown in FIG. 2b, in which the second counter 26 is not necessary. In the embodiment shown in FIG. 2b, a coded rotational angle encoder is utilized as the shaft encoder 3 to directly supply output signals to the address inputs of the memory circuit 29 through a line 30, and thereby to supply the desired correction of the oscillator frequency during a sweep of the plane 14 by the beam 12.

Figure 3:
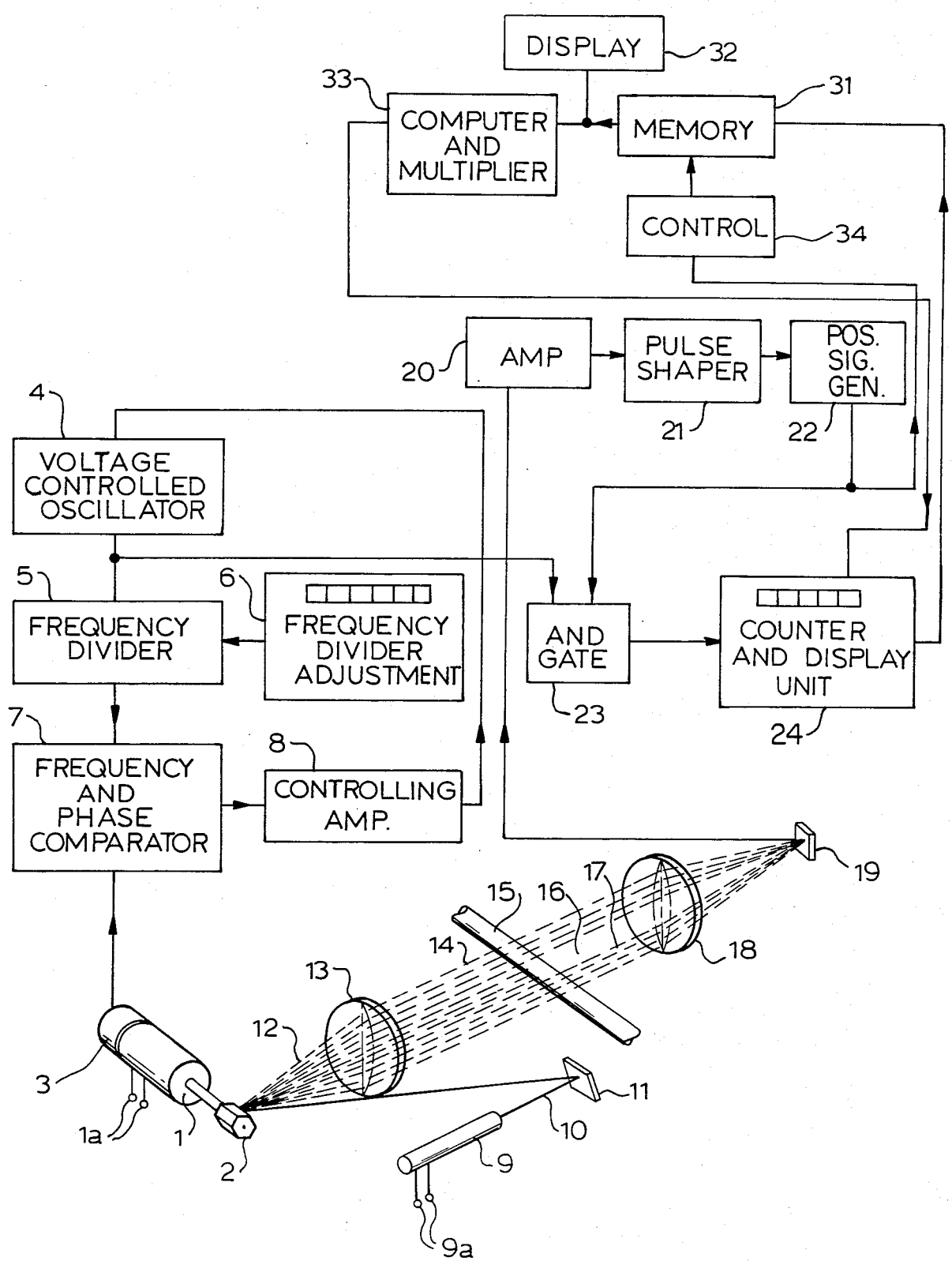
FIG. 3 is a further embodiment of either the device of FIG. 1 or of FIG. 2 with additional circuitry for further minimizing measurement error.

A further embodiment for reducing the error due to random deviations of the sweep velocity as shown in FIG. 3. The device illustrated in FIG. 3 is that shown in FIG. 1 with the addition of a memory 31, an additional display unit 32, a digital computation circuit 33 and a control device 34.

The memory circuit 31 is connected to the counter and display unit 24 which operates as described above, so that the counter reading of the unit 24 is supplied to the memory 31. Output signals from the memory 31 corresponding to the memory content are supplied to a display 32 for visual output which, if necessary, may also contain additional processing circuitry to match the memory output to any other associated circuitry which may be utilized in connection with the device. The output of the memory 31 is also supplied to the data inputs of a digital computation circuit 33 which performs the operation of computing a value which is the difference between the value 1 and the reciprocal of a value which is greater than the value 1. The digital computation circuit 33 multiplies the resulting difference times the input values from the memory 31. The counter 24 is set to a counter reading corresponding to the product and after termination of each counting operation in the counting device 24 (corresponding to temporal interruptions of the light beam by the object 15 to be measured) an electronic control device 34 triggers the storage in the memory 31 of the output signals of the counter 24 which correspond to the instantaneous counter reading. After the time required for the calculation of the new value of the product, the control unit 34 resets the counting device to the counter reading corresponding to the product. Each further counting operation after the counter reading effected by the control device 34 in the preceding measuring cycle ensues accumulatively, so that a temporal averaging of the output signals of the memory circuit 31 results. By choosing of the said value greater than 1 the manner of the temporal averaging can be defined whereby a value substantially greater than the value 1 effects a very slow following of the value displayed in the display 32 in comparison with the value which would be displayed in the display of the counter 24 without this further embodiment.

The basic circuit design of FIG. 1 can be further modified for additional correction by utilizing the output signals of the frequency and phase comparator 7 to represent a lead or a lag in rotational velocity and conducting the leading or lagging signal to an up/down counter 35 with a leading signal triggering an upward counting, and a lagging signal triggering a downward counting. The output of the up/down counter 35 is then conducted to a digital/analog converter 36. In order to supress the frequency sidebands in the voltage controlled oscillator, the analog output of the digital/analog converter 36 is connected with the input of the controlling amplifier 8 in the frequency and phase control loop so that a temperature compensation loop is achieved with the input bias current requirement of the amplifier 8 changing according to the thermal condition of the amplifier 8, and being compensated by the change in the counter 35 reading of the up/down counter 35.

Although other changes and modifications may be suggested by those skilled in the art it is the intention of the inventor to embody within the patent warranted hereon all changes and modifications as reasonably come within the scope of his contribution to the art.

I claim as my invention:

1. An opto-electronic measuring device for measuring the position or dimensions of an object for use with a light source which emits a highly coherent light beam, said measuring device comprising:

a motor having a rotating drive shaft;

a single or multifaced rotating mirror mounted on said shaft for rotation by said motor;

a deflecting mirror positioned to reflect said light beam from said light source to said rotating mirror to produce a scanning plane of light;

a collimating means to bend light in said scanning plane into parallel beams directed at an object to be measured, said object interrupting a portion of said parallel beams;

a first light receiver for receiving non-interrupted parallel light beams and generating a signal corresponding to the position of said interrupted portion of parallel beams;

a focusing means to direct non-interrupted light to said first light receiver;

a voltage controlled oscillator for producing pulses of a controlled frequency;

a means for generating and displaying a position signal derived from said signal from said first light receiver including a means for counting the number of pulses from said oscillator which occur during each interruption, said position signal representing the position or dimension of the object to be measured;

a shaft encoder mounted on said drive shaft for corotation with said rotating mirror for generating a pulse signal at a first output having a pulse frequency proportional to the angular velocity of said motor and said rotating mirror;

a frequency control loop for controlling the frequency of said pulses from said oscillator for which the pulse signal from said shaft encoder serves as a reference signal, said frequency control loop including
  a frequency divider for receiving the output of said voltage controlled oscillator, and
  a phase and frequency comparator connected to said frequency divider and said shaft encoder for comparing the respective frequencies thereof and for generating an error signal corresponding to a difference between said frequencies, said comparator being connected to said voltage controlled oscillator for supplying said error signal thereto so that the oscillator output is continuously synchronized with the angular velocity of said rotating mirror;
a frequency divider adjustment circuit connected to said frequency divider for selectively changing the dividing ratio of said frequency divider;
a counter to which pulses from said shaft encoder are supplied;
a means for generating a reset signal to set said counter, said reset signal corresponding to at least one specific position of said drive shaft; and
an addressable memory connected to said counter with the contents of said counter determining a memory output, said memory output being conducted to said frequency divider adjustment circuit for automatically operating the frequency divider adjustment circuit to change the dividing ratio.

2. The opto-electric measuring device of claim 1 wherein the means for generating the reset signal is a second light receiver disposed to receive light from said scanning plane immediately prior to impingement on said collimating means, said second receiver generating a signal corresponding to the moment of incidence of light thereon.

3. The opto-electric measuring device of claim 1 wherein the means for generating the reset signal is a second signal output of said shaft encoder at which a pulse appears corresponding to at least one specific position of said shaft encoder.

4. The opto-electric measuring device of claim 1 wherein said shaft encoder is a coded rotational angle encoder and further comprising an addressable memory having address inputs connected to said rotational angle encoder for receiving signals therefrom and having an output connected to said frequency divider adjustment circuit, said signal from the rotational angle encoder producing a memory output signal for control of said frequency divider adjustment circuit to change the frequency divider dividing ratio to compensate for a change in the angular velocity of said rotating mirror.

5. The opto-electric measuring device of claim 1 further comprising:
  an up/down counter connected to said comparator, said up/down counter counting in a first direction if said encoder signal frequency leads said oscillator frequency and counting in a second direction if said encoder signal frequency lags said oscillator frequency;
  a digital/analog converter connected to an output of said up/down counter; and
  a controlling amplifier having a bias current input connected in summing mode to the output of said comparator and also to the output of said digital/analog converter and an output pre-connected to said voltage controlled oscillator so that operating fluctuations due to temperature effects in said amplifier and/or in said oscillator will be compensated by a corresponding change in said up/down counter output thereby to prevent an erroneous oscillator frequency change due to temperature changes.

6. The opto-electric measuring device of claim 1 wherein said means for generating and displaying the position signal comprises:
  a counter which can be set to any selected count, said counter generating an output signal corresponding to an instantaneous count reading;
  an addressable memory connected to said counter for receiving signals therefrom, said memory having a memory output corresponding to a received count reading;
  a digital computation circuit connected to said memory output, said digital computation circuit computing a value which is the product formed by multiplying said memory output by the difference between one and the reciprocal of a number greater than one;
  an electronic control circuit connected to said counter and said memory and operating to trigger a transfer of the counter output to said memory at the termination of each counting operation which is undertaken during each interruption of said parallel beams due to the presence of an object to be measured, and further operating to set the count of said counter to the value of said product after a period for calculation of said product, so that each subsequent counting operation ensues accumulatively with respect to the set count; and
  means for displaying the content of said memory.

* * * * *